Patented Feb. 27, 1945

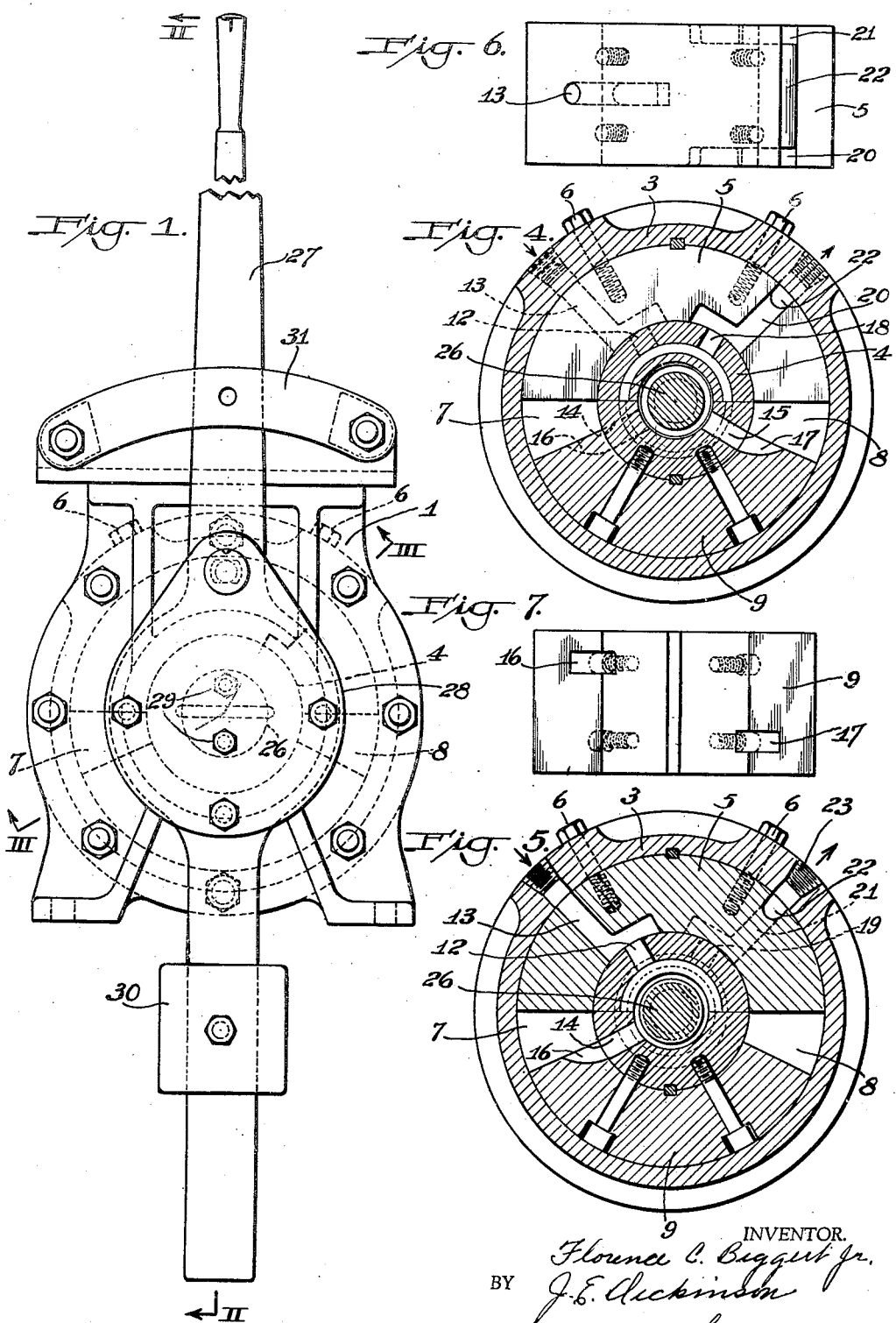

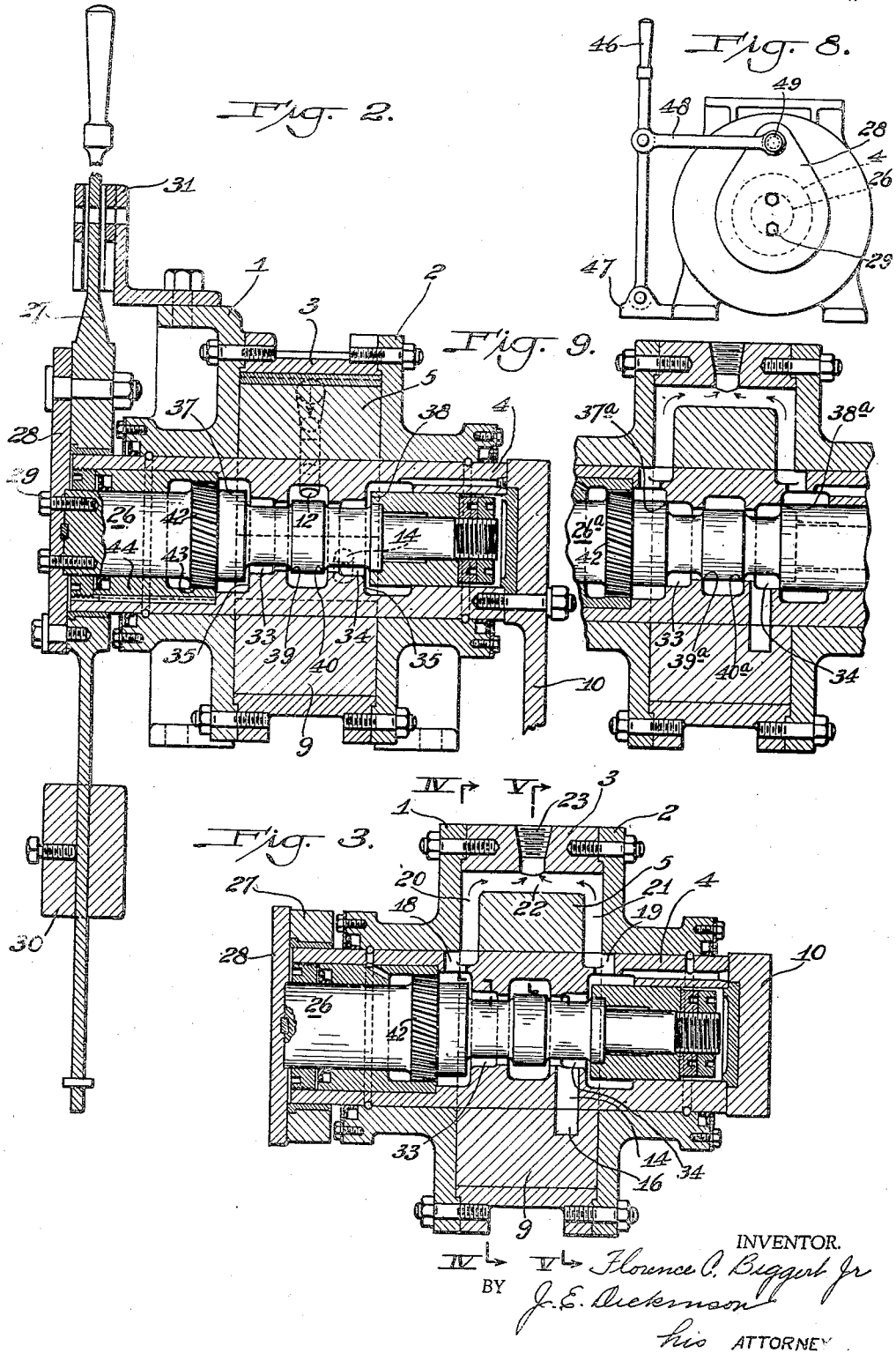

2,370,137

UNITED STATES PATENT OFFICE 2,370,137

SERVOMOTOR

Florence C. Biggert, Jr., Pittsburgh, Pa., assignor to United Engineering and Foundry Company, Pittsburgh, Pa., a corporation of Pennsylvania Application May 12, 1942, Serial No. 442,878

15 Claims. (Cl. 121—41)

This invention relates to servo-motors, and more particularly to those in the operation of which the operator "feels" the variations in the amount of power being applied by the motor to the apparatus it is controlling.

As is well known, servo-motors are used for assisting an operator to control or actuate apparatus which it may be difficult or impossible for him to operate without such mechanical assistance. It often is very desirable that the operator have a general idea as to the amount of force being used to actuate the apparatus at any given moment, so servo-motors have been designed which require manual effort on the part of the operator in proportion to the power required from the servo-motor. This gives the same type of feeling or variable reaction to the operator as if he were actuating the apparatus entirely by hand.

It is among the objects of this invention to provide a servo-motor which is actuated by fluid under pressure, which is of simple and compact construction, and which, depending upon the relative dimensions of its fluid controlling means, may be made to give to the operator a variable reaction or sense of power input proportional to the power actually being exerted by the motor in performing its function.

In accordance with this invention, fluid pressure actuated driving means is provided which is adapted to be connected to the apparatus that is to be operated by the servo-motor. Means is associated with the driving means to control the fluid pressure. The control means preferably is so formed as to be influenced by the fluid pressure whereby the effort required to operate the control means is related or proportional to the fluid pressure required at any given time for actuating the driving means. The control means is connected to the driving means in such a way that the latter may be actuated by the control means directly as well as by the fluid pressure controlled by the control means. The driving means preferably comprises a rotatable sleeve provided with fluid inlet and outlet ports, and the control means includes a spindle-like valve member mounted for helical movement in the sleeve. The sleeve and spindle may be so formed that the axial movement of the spindle in the sleeve is resisted by the fluid pressure that it controls, whereby increased manual effort is required to move the spindle when a greater fluid pressure is required for turning the sleeve. In such a case, the greater the load being actuated by the sleeve the greater will be the manual effort necessary to actuate the spindle, and therefore substantially the same "feel" will be experienced by the operator as though he were actuating the load without the assistance of the servo-motor.

The preferred embodiment of the invention is illustrated in the accompanying drawings in which Fig. 1 is an end view of my servo-motor for use with a constant volume pump; Fig. 2 is a vertical section taken on the line II—II of Fig. 1; Fig. 3 is a similar section taken on the line III—III of Fig. 1; Figs. 4 and 5 are transverse vertical sections taken on the lines IV—IV and V—V, respectively, of Fig. 3; Figs. 6 and 7 are plan views of two of the elements inside of the motor housing and which will be described later; Fig. 8 is a reduced end view of a modification; and Fig. 9 is a fragmentary vertical section, similar to Fig. 3, of a further modification for use with a constant pressure pump.

Referring to Figs. 2 and 4 of the drawings, a metal housing is formed from two spaced end members 1 and 2 connected together near their peripheries by a cylindrical member 3. The central portions of the end members are provided with aligned and flanged horizontal openings in which a tubular member or sleeve 4 is rotatably mounted. Filling the upper part of the cylindrical member and extending a substantial distance around the sleeve is a block 5 joined to the housing by bolts 6. This block forms a part of the housing and can be considered as being integral therewith.

The housing has thus a chamber in the lower half, more or less, of its central portion. This chamber is divided into two small pressure chambers 7 and 8 of variable size by a block or vane 9 rigidly connected to the bottom of the sleeve. The vane and sleeve constitute the driving means that actuate the apparatus (not shown) to which the servo-motor is connected. The sleeve projects from the opposite ends of the housing, and an actuating arm 10 is rigidly connected to the sleeve's rear end and projects downwardly therefrom with its lower end formed for suitable connection to the apparatus that is to be actuated.

To aid in turning the sleeve in the housing, fluid, such as oil, is supplied to the two chambers 7 and 8 in such a way as to create a greater pressure in one or the other of the chambers as desired, whereby the vane is swung to the right or left. To admit the fluid from a constant volume pump (not shown) the upper portion of the sleeve is provided with a central port 12 (Fig. 5) that registers with an inlet passage 13 extending through the adjoining block 5 and cylindrical housing member 3. The inner end of the passage extends part way around the sleeve so that port 12 will remain in communication with it when the sleeve is oscillated in the housing. As shown in Figs. 3, 4, 5, and 7, the inside of the sleeve is connected with chambers 7 and 8 by ports 14 and 15 in its lower portion communicating with recesses 16 and 17, respectively, in the adjoining end walls of the vane that open into the fluid pressure chambers. The upper portion of the sleeve is also provided with a pair of outlet ports 18 and 19 communicating with the lower ends of recesses 20 and 21, respectively, in the side walls of block 5, as shown in Figs. 3, 4, and 6. The upper ends of these recesses are connected by a recess 22 the central portion of which communicates with the lower end of an outlet port 23 in the housing wall. Fluid from the pump thus constantly flows into and out of the sleeve and keeps the two pressure chambers filled.

In order to control the flow of pressure fluid in the servo-motor for the purpose of creating a pressure differential between chambers 7 and 8, a spindle-like valve member 26 is rotatably mounted in the sleeve. The spindle is turned by a lever 27 (Figs. 1 and 2) having an enlarged central portion rotatably mounted on the projecting front end of the sleeve. A plate 28 fastened to the front side of the central portion of the lever has screws 29 connecting it to the adjoining end of the spindle. The lever has a downwardly extending portion on which a counter-weight 30 is adjustably mounted, and an upwardly projecting handle portion that extends through a slot in a bracket 31 attached to the top of the housing. The slot is wide enough to permit the lever to move in a direction parallel to the axis of the sleeve for a purpose to be described later.

As shown in Figs. 2 and 3, at opposite sides of inlet port 12 the interior of the sleeve is reduced in diameter to provide between the outlet ports a pair of reduced passages 33 and 34 terminating at their outer ends in outwardly facing radial valve seats 35. Normally spaced from these seats are inwardly facing radial valve seats 37 and 38 formed on the spindle by reducing the diameter of its central portion. The area of the inner ends of passages 33 and 34 is less than that of their outer ends, and the inner ends are adapted to be more or less closed by valve seat areas 39 and 40 formed by slightly enlarging the central portion of the spindle. These seats normally are spaced equal distances from the inner ends of passages 33 and 34, and they are preferably smaller in area than outer seats 37 and 38.

The fluid flowing through the servo-motor is controlled by the movement of the spindle axially in the sleeve. Such movement is brought about by means of helical gear teeth 42 on the spindle that mesh with similar teeth 43 in a plug 44 that is rigidly mounted in the sleeve around the spindle. Thus, if the resistance of the sleeve to turning is sufficient to overcome the friction between the gear teeth when the spindle is turned by lever 27 the spindle will rotate in the sleeve and the teeth will act like screw threads to cause it to move lengthwise at the same time.

In the operation of the servo-motor disclosed herein the lever 27 is swung either to the left or to the right, according to the direction in which it is desired to swing arm 10 that is connected to the apparatus or load to be actuated. If it is a light load the friction between the helical gear teeth will cause the sleeve to be rotated by, and in unison with, the spindle. In such a case the spindle will remain centered in the sleeve and no pressure differential is created between chambers 7 and 8, so the fluid plays no part in turning the sleeve, and the lever therefore, in effect, is directly connected to arm 10.

Now, if the load increases sufficiently to overcome the friction between the gear teeth, the spindle will rotate in the sleeve, and the gear teeth will give to the spindle a helical motion that will move it axially either farther into or out of the sleeve, depending upon which way the lever is being swung. Assuming for the sake of illustration that the lever is swung to the right in Fig. 1, the spindle will move inwardly or to the right in Figs. 2 and 3. The width of the slot in bracket 31 permits movement of the lever parallel to the axis of the sleeve. The axial movement of the spindle tends to close the outer end of passage 33 and the inner end of passage 34 in the sleeve while opening wider the inner end of the first passage and the outer end of the second. The flow of incoming fluid thus is more or less cut off from passage 34, but the fluid in chamber 7 is free to pass out through the associated exhaust passage 21. At the same time the exhaust from passage 33 through its associated outlet 21 is substantially shut off by valve seat 37, but the passage between inlet 12 and passage 33 is opened wider. Consequently, practically all of the incoming fluid from the pump is directed into chamber 8 through sleeve port 15. This creates a pressure differential between the two chambers which swings vane 9 to the left in Figs. 4 and 5 and thereby rotates the sleeve to the right. The greater the resistance of the sleeve to turning, the farther the spindle will move axially to the right and the greater the pressure differential that will be created between the two chambers for overcoming the resistance of the sleeve. That is, the greater the pressure differential, the more power the fluid pressure will exert to turn the sleeve.

As the sleeve is rotated by fluid pressure against one side of vane 9, the helical gear teeth 42, 43 will cause the spindle to move axially toward the left until the valve openings are thereby adjusted to the extent necessary to balance the fluid pressure on vane 9 against the load to which the sleeve is connected. In case the servo-motor merely moves the load to a new position in which it will stay until again moved by the servo-motor, the axial movement of the spindle to the left will continue until it is in centered position in the sleeve, as shown in Fig. 2.

Due to the area of valve seat 37 being greater than that of seat 39 the fluid pressure exerted against seat 37 is greater than that against seat 39. This, together with the fact that there is substantially no fluid pressure in passage 34, causes the fluid pressure in passage 33 to resist inward movement of seat 37 and the spindle so that the operator feels the resistance of the spindle to turning in the sleeve. This "feeling" or reaction varies in proportion to the fluid pressure in passage 33, which, as pointed out before, varies in accordance with the resistance of the sleeve to turning.

In case lever 27 is swung to the left instead of the right, the spindle will move to the left in Figs. 2 and 3 when it turns relative to the sleeve. This exhausts chamber 8 and causes fluid pressure to be built up in chamber 7 and passage 34. This pressure resists inward movement of spindle valve seat 38, and the resistance is transmitted through lever 27 to the operator.

The distance that the operator's hand must travel in swinging the lever can be reduced by mounting the lever in some such manner as shown in Fig. 8. Thus, the lever 46 may be pivoted at the lower end on the laterally projecting base 47 of the motor. A link 48 is pivotally connected to the central portion of the lever and to the upper end of plate 28 rigidly mounted on the projecting end of the spindle. The pin 49 by which the link is connected to plate 28 has a sliding fit with one or the other of them so that the spindle will be free to move longitudinally. If desired, any other suitable flexible connection may be used in the lever system to prevent it from restraining longitudinal movement of the spindle.

The amount of manual effort on the hand lever required to move the spindle axially for any given load is determined by the difference in areas of the inner and outer valve seats on the spindle in combination with the inclination of the gear teeth 42 and 43, the length of the hand lever, the pressure area of vane 9, the maximum oil pressure of which the pump is capable, etc. This servomotor is simple, compact, and readily attachable to existing lever mechanisms. It is particularly adaptable to applications in which no effort is required to maintain the load in standing position since in this case the pump operates for the most part at little or no pressure. Also, the motor operates upon the simplest of fluid pressure systems requiring no accumulator pressure control system or complicated variable discharger type of pump. The ends of the sleeve and spindle to which lever 27 and arm 10 are connected project from exhaust chambers within the motor, wherefore high pressure packings are unnecessary.

The servo-motor disclosed in detail above is designed for use with a constant volume pump and for that reason it is not well suited for applications where a load must be sustained over long periods of time because under such conditions the constant volume pump will have to work continually at considerable pressure. In Fig. 9 there is illustrated a servo-motor of the same general construction but which is more suitable for use where a load must be sustained for a long time. This embodiment is for use with a constant pressure pump, and the essential difference between it and the first embodiment is that the radial valve seats 37a, 38a, 39a, and 40a are formed for closing the opposite ends of passages 33 and 34 when the spindle 26a is in centered position as shown. In this position the inlet and exhaust ports are closed with the closing edges of the valve seats being either line and line or, if extreme sensitivity is not required, having a small lap. With this construction of servo-motors there is only leakage flow even when holding a load constantly. The operation of this embodiment of the invention otherwise is the same as the first embodiment.

It will be understood that either form of servomotor disclosed herein can be made to operate without transmitting "feel" to the operator by making the valve seats on the spindle all of equal diameter. Such a motor still will operate with a sensitivity equal to any cylinder type of servomotor.

According to the provisions of the patent statutes, I have explained the construction and operation of my invention and have illustrated and described what I now consider to represent its best embodiment. However, I desire to have it understood that, within the scope of the appended claims, the invention may be practiced otherwise than as specifically illustrated and described.

I claim:

1. In a fluid pressure servo-motor, driving means formed for actuation by fluid pressure, valve means for controlling the fluid pressure that actuates the driving means, a connection between said driving means and valve means by which the latter is movable in direction of motion of the driving means and also at right angles to the direction of motion of the driving means, and means for operating the valve means, said valve means being so formed that its said right angle movement is resisted by the fluid pressure that it controls whereby the effort required to operate the valve means is proportional to the resistance of said driving means to actuation.

2. In a fluid pressure servo-motor, a housing, driving means oscillatable in the housing and dividing it into a pair of expansible and contractible chambers adapted to receive fluid under pressure, and fluid control means oscillatably mounted in the housing and associated with said driving means and also movable axially thereof to control the delivery of pressure fluid to said chambers and thereby produce a pressure differential in the chambers for moving the driving means selectively in either direction, the farther the control means is moved axially of the driving means the greater is said pressure differential, and said control means being so formed that its said axial movement is resisted by the fluid pressure whereby increased effort is required to actuate the control means when a greater fluid pressure differential is required for moving the driving means.

3. In a fluid pressure servo-motor, an oscillatable driven member adapted to be connected to a load, a housing, driving means in the housing connected to said driven member and having an opening therein, said means being oscillatable in the housing and dividing it into a pair of expansible and contractible chambers adapted to receive fluid under pressure, and manually operable fluid control means mounted in said opening in the driving means for movement in a helical path therein to control the delivery of pressure fluid to said chambers and thereby produce a pressure differential in the chambers for moving the driving means selectively in either direction, the relation of the driving means to the control means being such that the farther the latter is moved relative to the driving means the greater is said pressure differential, and said control means being so formed that its said relative movement is resisted by the fluid pressure whereby increased manual effort is required to actuate the control means when a greater fluid pressure differential is required for moving a greater load connected to said driven member.

4. In a fluid pressure servo-motor, an oscillatable driven member adapted to be connected to a load, a housing, driving means in the housing connected to said driven member and having an opening therein, said means being oscillatable in the housing and dividing it into a pair of expansible and contractible chambers adapted to receive fluid under pressure, a spindle valve mounted movably in said opening in the driving means, manually operable means connected to the spindle for actuating it, means connecting the spindle to the driving means for rotation relative to the driving means and for movement of the spindle axially to control the delivery of pressure fluid to said chambers to thereby produce a pressure differential in the chambers for moving the driving means selectively in either direction, the farther the control means is moved axially of the driving means the greater is said pressure differential, and said control means being so formed that its said axial movement is resisted by the fluid pressure whereby increased manual effort is required to actuate the control means when a greater fluid pressure differential is required for moving a greater load connected to said driven member.

5. In a fluid pressure servo-motor, an oscillatable driven member adapted to be connected to a load, a housing, driving means in the housing connected to said driven member and having an opening therein, said means being oscillatable in the housing and dividing it into a pair of expansible and contractible chambers adapted to receive fluid under pressure, a spindle valve movably mounted in said opening in the driving means, manually operable means connected to the spindle for actuating it, a helical gear-like connection between the spindle and driving means so they can rotate together and the spindle also can move axially to control the delivery of pressure fluid to said chambers and thereby produce a pressure differential in the chambers for moving the driving means selectively in either direction, the farther the control means is moved axially of the driving means the greater is said pressure differential, and said control means being so formed that its said axial movement is resisted by the fluid pressure whereby increased manual effort is required to actuate the control means when a greater fluid pressure differential is required for moving a greater load connected to said driven member.

6. In a fluid pressure servo-motor, an oscillatable driven member adapted to be connected to a load, a housing, driving means in the housing connected to said driven member, said means being oscillatable in the housing and dividing it into a pair of expansible and contractible chambers adapted to receive fluid under pressure, said driving means having a hollow portion provided with inlet and outlet ports and also provided with ports connecting the inside of said means with said chambers, and manually operable fluid control means oscillatably mounted in the housing and associated with said driving means and also movable axially thereof to control the flow of pressure fluid through said ports to thereby produce a pressure differential in the chambers for moving the driving means selectively in either direction, the farther the control means is moved axially of the driving means the greater is said pressure differential, and said control means being so formed that its said axial movement is resisted by the fluid pressure whereby increased manual effort is required to actuate the control means when a greater fluid pressure differential is required for moving a greater load connected to said driven member.

7. In a fluid pressure servo-motor, a housing, a sleeve rotatably mounted therein, a vane projecting from the side of the sleeve and dividing the housing into a pair of expansible and contractible chambers adapted to receive fluid under pressure, said sleeve being provided with inlet and outlet ports and also ports connecting the inside of the sleeve with said chambers, a spindle valve in the sleeve, a connection between the spindle and sleeve permitting helical motion of the spindle relative to the sleeve, and manually operable means for turning the spindle in order to produce said helical motion and control the delivery of pressure fluid to said chambers for moving said vane, the spindle and sleeve being so formed that said helical movement of the spindle is resisted by the fluid pressure whereby the manual effort required to actuate the spindle is proportional to the fluid pressure required to move said vane.

8. In a fluid pressure servo-motor, a housing, a sleeve rotatably mounted therein, a vane projecting from the side of the sleeve and dividing the housing into a pair of expansible and contractible chambers adapted to receive fluid under pressure, said sleeve being provided with inlet and outlet ports and also ports connecting the inside of the sleeve with said chambers, a spindle valve in the sleeve, a connection between the spindle and sleeve permitting helical motion of the spindle relative to the sleeve, and manually operable means for turning the spindle in order to produce said helical motion and control the delivery of pressure fluid to said chambers for moving said vane, the spindle having opposed valve seats of different areas so that its helical movement is influenced by the fluid pressure it controls whereby the manual effort required to actuate the spindle is proportional to the fluid pressure required to move said vane.

9. In a fluid pressure servo-motor, fluid pressure actuated driving means, means operable to control said fluid pressure, and a connection between said control means and driving means that produces helical motion of the control means when the latter is rotated relative to the driving means, whereby the flow of fluid to the servo-motor is controlled and differential pressures are created that actuate the driving means.

10. In a fluid pressure servo-motor, an oscillatable driven member adapted to be connected to a load, a housing, driving means in the housing connected to said driven member and having an opening therein, said means being oscillatable in the housing and dividing it into a pair of expansible and contractible chambers adapted to receive fluid under pressure, manually operable fluid control means mounted in said opening in the driving means for movement in a helical path therein to control the delivery of pressure fluid to said chambers and thereby produce a pressure differential in the chambers for moving the driving means selectively in either direction, the relation of the driving means to the control means being such that the farther the latter is moved relative to the driving means the greater is said pressure differential, a lever pivotally connected at one end to a support at the side of said control means, and means operatively connecting the control means to the lever between the ends for turning the control means when the lever is actuated, and said control means being so formed that its said relative movement is resisted by the fluid pressure whereby increased manual effort is required to actuate the control means when a greater fluid pressure differential is required for moving a greater load connected to said driven member.

11. In a fluid pressure servo-motor, an oscillatable driven member adapted to be connected to a load, a housing, driving means in the housing connected to said driven member and having an opening therein, said means being oscillatable in the housing and dividing it into a pair of expansible and contractible chambers adapted to receive fluid under pressure, manually operable fluid control means mounted in said opening in the driving means, and a connection between said control means and driving means that produces helical motion of the control means when the latter is rotated relative to the driving means, whereby to control the delivery of pressure fluid to said chambers and thereby produce a pressure differential in the chambers for moving the driving means selectively in either direction, the relation of the driving means to the control means being such that the farther the latter is moved relative to the driving means the greater is said pressure differential.

12. In a fluid pressure servo-motor, an oscillatable driven member adapted to be connected to a load, a housing, driving means in the housing connected to said driven member and having an opening therein, said means being oscillatable in the housing and dividing it into a pair of expansible and contractible chambers adapted to receive fluid under pressure, a spindle valve movably mounted in said opening in the driving means, manually operable means connected to the spindle for actuating it, a helical gear-like connection between the spindle and driving means so they can rotate together and the spindle also can move axially to control the delivery of pressure fluid to said chambers and thereby produce a pressure differential in the chambers for moving the driving means selectively in either direction, the farther the control means is moved axially of the driving means the greater is said pressure differential.

13. In a fluid pressure servo-motor, a housing, a sleeve rotatably mounted therein, a vane projecting from a side of the sleeve and dividing the housing into a pair of expansible and contractible chambers adapted to receive fluid under pressure, said sleeve being provided with inlet and outlet ports and also ports connecting the inside of the sleeve with said chambers, a spindle valve in the sleeve, a connection between the spindle and sleeve causing helical motion of the spindle when the latter is rotated relative to the sleeve, and manually operable means for turning the spindle in the sleeve in order to control the delivery of pressure fluid to said chambers for moving said vane.

14. A fluid pressure servo-motor for use with a constant pressure pump, said motor comprising an oscillatable driven member adapted to be connected to a load, a housing, driving means in the housing connected to said driven member, said means being oscillatable in the housing and dividing it into a pair of expansible and contractible chambers adapted to receive fluid under pressure, said driving means having a hollow portion provided with inlet and outlet ports and also provided with ports connecting the inside of said means with said chambers, fluid control means oscillatably mounted in the housing and associated with said driving means and also movable axially thereof, and means compelling helical motion of said fluid control means when the latter is rotated relative to the driving means whereby to control the flow of pressure fluid through said ports to thereby produce a pressure differential in the chambers for moving the driving means selectively in either direction, said control means being formed to close said inlet and outlet ports when the control means is in centered position.

15. In a fluid pressure servo-motor for use with a constant pressure pump, a housing, driving means oscillatable in the housing and dividing it into a pair of expansible and contractible chambers adapted to receive fluid under pressure, and fluid control means oscillatably mounted in the housing and associated with said driving means and also movable axially thereof to control the delivery of pressure fluid to said chambers and thereby produce a pressure differential in the chambers for moving the driving means selectively in either direction, the farther the control means is moved axially of the driving means the greater is said pressure differential, said control means being so formed that its said axial movement is resisted by the fluid pressure whereby increased effort is required to actuate the control means when a greater fluid pressure differential is required for moving the driving means, and said control means being formed to close said inlet and outlet ports when the control means is in centered position relative to the driving means.

FLORENCE C. BIGGERT, JR.